United States Patent
DiRisio

(10) Patent No.: US 6,741,400 B2
(45) Date of Patent: May 25, 2004

(54) MULTIPLE POSITION LENS BARREL HAVING CAM CYLINDER WITH COMMONLY BIASED FIRST AND SECOND LENS CARRIERS

(75) Inventor: Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/264,757

(22) Filed: Oct. 4, 2002

(65) Prior Publication Data

US 2004/0066564 A1 Apr. 8, 2004

(51) Int. Cl.[7] .............................................. G02B 15/14
(52) U.S. Cl. ........................................ 359/699; 359/700
(58) Field of Search ................................ 359/699, 700, 359/701, 704, 823

(56) References Cited

U.S. PATENT DOCUMENTS

| 3,672,280 A | 6/1972 | Imura |
| 5,216,549 A | 6/1993 | Notagashira et al. |
| 5,225,939 A | 7/1993 | Iizuka |
| 5,289,320 A | 2/1994 | Kobayashi |
| 5,376,983 A | * 12/1994 | Yamazaki et al. ............. 396/72 |
| 5,381,272 A | * 1/1995 | Kato et al. .................... 359/823 |
| 5,488,513 A | * 1/1996 | Tanaka ......................... 359/699 |
| 5,515,205 A | * 5/1996 | Yokoyama et al. .......... 359/699 |
| 5,673,099 A | 9/1997 | Haraguchi et al. |
| 5,930,053 A | * 7/1999 | Oono et al. .................. 359/696 |
| 6,369,956 B1 | 4/2002 | Nomura et al. |

FOREIGN PATENT DOCUMENTS

JP 2-103512 * 4/1990 ............ G02B/7/10

* cited by examiner

Primary Examiner—Ricky Mack
(74) Attorney, Agent, or Firm—Robert Luke Walker

(57) ABSTRACT

A multiple position lens barrel has a first lens carrier defining an optical axis. The first lens carrier has a set of first cam followers. A second lens carrier is aligned with the optical axis. The second lens carrier has a set of second cam followers. A cam cylinder has a tubular wall surrounding a passage aligned with the optical axis. The cam cylinder has a set of one or more first cam tracks and a set of one or more second cam tracks. The first and second cam tracks are axially spaced apart. Each cam track extends away from the wall in a radial direction. Each cam track extends along and about the optical axis. A biaser biases the cam followers toward respective can tracks.

19 Claims, 7 Drawing Sheets

MULTIPLE POSITION LENS BARREL HAVING CAM CYLINDER WITH COMMONLY BIASED FIRST AND SECOND LENS CARRIERS

FIELD OF THE INVENTION

The invention relates to photography and photographic equipment and more particularly relates to a multiple position lens barrel having commonly biased first and second lens carriers.

BACKGROUND OF THE INVENTION

A great many zoom lens barrels and other multiple position lens barrels are available that provide accurate and precise positioning of lens groups using complex and costly mechanisms. Those lens barrels are unsuitable for inexpensive cameras, particularly one-time-use and other simple cameras. With simple cameras, mechanisms used typically have a small number of parts that are relatively easy to manufacture and simple to assemble.

One of the complexities of some zoom lens barrels arises from a requirement of moving two different lens groups (a "lens group" has one or more lens elements) relative to both the focal plane and each other, in accordance with particular optical designs. A solution is the use of different, but linked mechanisms to move the two lens groups. In U.S. Pat. No. 5,673,099, a cylindrical tube has a pair of differently shaped cam grooves. Cam followers joined to the two different lens groups follow respective grooves and move the lens groups accordingly, when the cylindrical tube is rotated relative to the lens groups. U.S. Pat. No. 6,369,956 is similar, but separates cam grooves onto different components. U.S. Pat. No. 5,216,549 discloses a lens barrel that uses a rib in place of a cam groove. U.S. Pat. No. 5,225,939 discloses a lens barrel that has a single component having a rib for one follower on an inside wall and a groove for another cam follower on an outside wall. This lens barrel has a reduced number of pieces in comparison to the others mentioned above, but has complexly shaped pieces.

U.S. Pat. Nos. 3,672,280 and 5,289,320 disclose lens barrels having spring urged lens positions. These mechanisms are relatively simple and, the case of U.S. Pat. No. 5,289,320, include use of a cam follower and cam. These lens barrels have the shortcoming of being limited to movement of a single lens group.

It would thus be desirable to provide an improved lens barrel and method in which a relatively small number of relatively simple parts can move two different lens groups relative to the focal plane and each other.

SUMMARY OF THE INVENTION

The invention is defined by the claims. The invention, in its broader aspects, provides a multiple position lens barrel that has a first lens carrier defining an optical axis. The first lens carrier has a set of first cam followers. A second lens carrier is aligned with the optical axis. The second lens carrier has a set of second cam followers. A cam cylinder has a tubular wall surrounding a passage aligned with the optical axis. The cam cylinder has a set of one or more first cam tracks and a set of one or more second cam tracks. The first and second cam tracks are axially spaced apart. Each cam track extends away from the wall in a radial direction. Each cam track extends along and about the optical axis. A biaser biases the cam followers toward respective cam tracks.

It is an advantageous effect of the invention that an improved lens barrel and method in which a relatively small number of relatively simple parts can move two different lens groups relative to the focal plane and each other.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
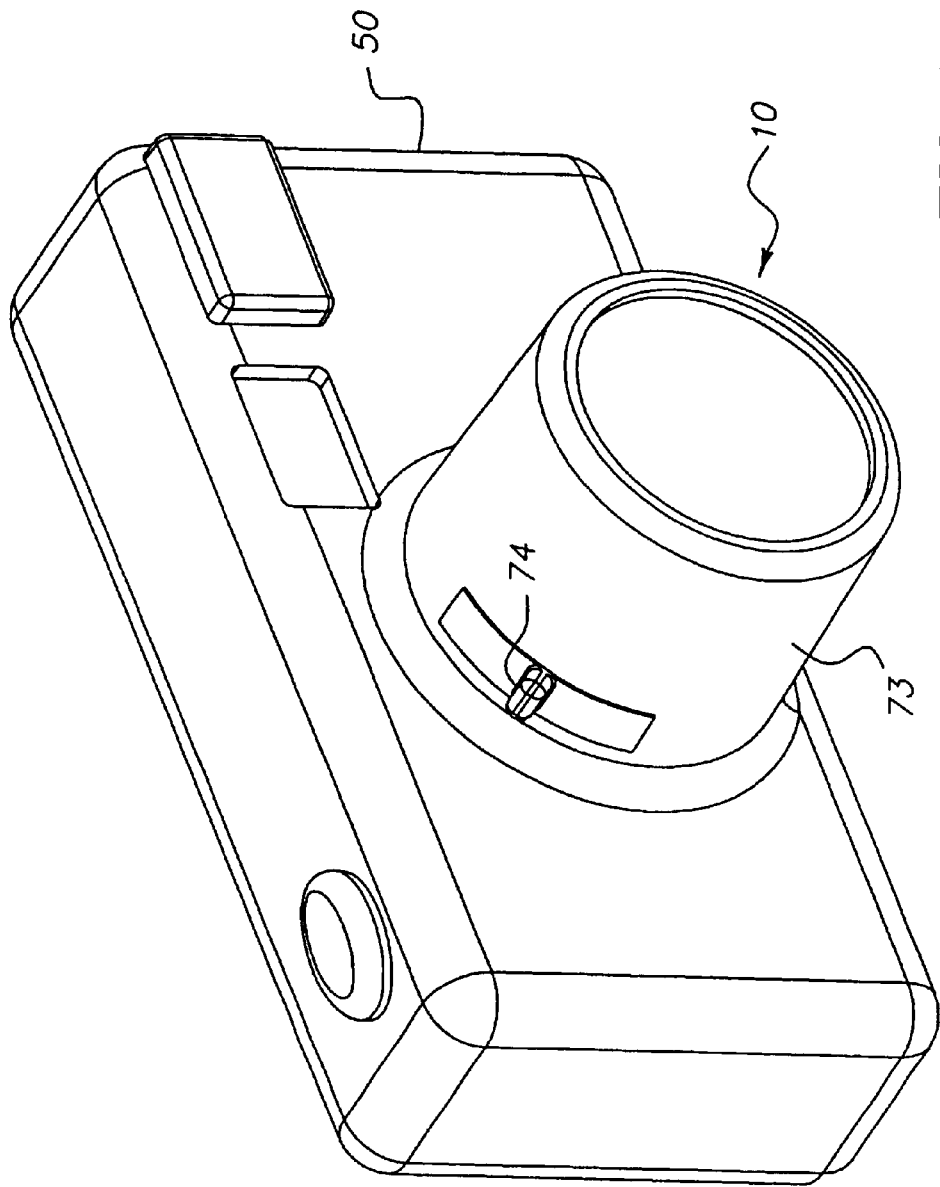
FIG. 1 is a perspective view of a camera including an embodiment of the multiple position lens barrel.
Figure 2:
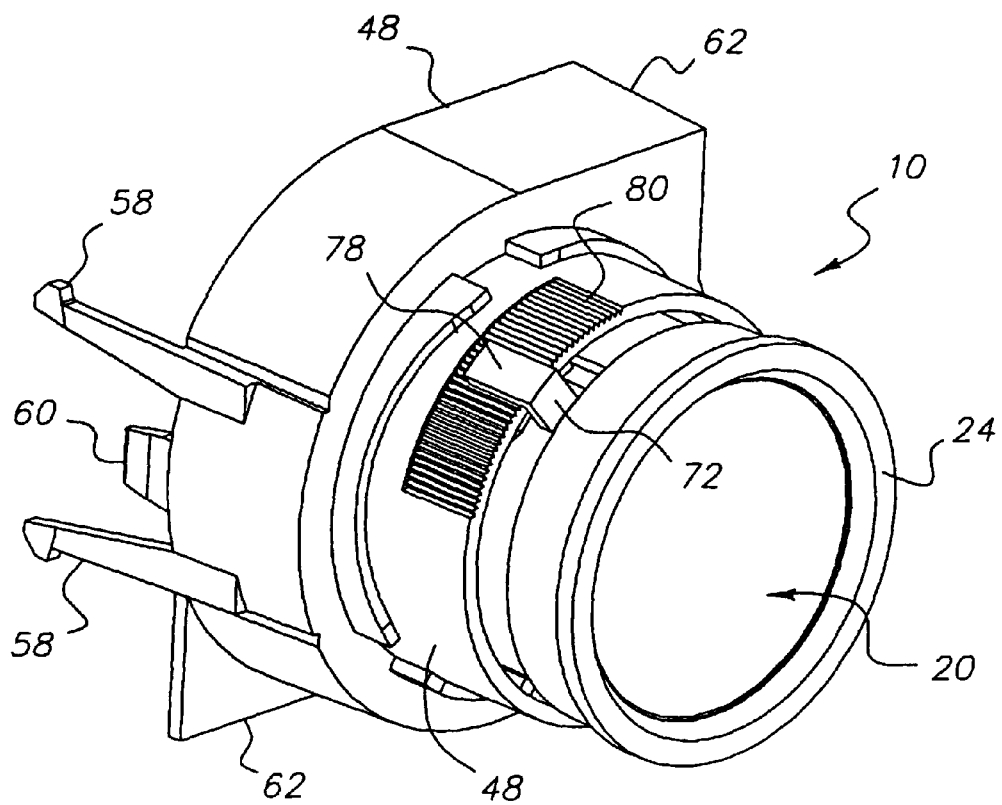
FIG. 2 is a perspective view of the lens barrel of FIG. 1.

The multiple position lens barrel 10 has first and second lens carriers 12,13, a biaser 14, and a mount-cam cylinder 16 aligned along an optical axis 18 defined by the lens carriers 12,13. Each lens carrier 12,13 of the lens barrel 10 is configured to hold a lens group 20,21. Each lens group 20,21 can have one or more lens elements 22. The lens barrel components provide for movement of the front and rear lens groups 20,21 relative to the focal plane of the lens system and each other. The manner in which these optical relationships change during relative movement and the shapes of cams (described below) that provide those changes is a function of the design of the lens system. Suitable lens systems are well known to those of skill in the art.

Both lens carriers 12,13 have a cap 24,26 attached to a retainer 28,30 with the lens elements 22 held between the two. Lens carriers 12,13 can include additional parts and one or more parts can be molded together in a single structure. The respective caps 24,26 and retainers 28,30 are held together by friction fit or engaging features, such as reciprocal threads, or by fasteners, or adhesive, sonic welding, or the like. The lens elements 22 can likewise be held in place in a similar manner. In the embodiments shown, the caps 24,26 are located axially outward relative to respective retainers 28,30, but one or both retainers 28,30 can instead be outermost. In the embodiments shown in the figures, front caps 24 and front retainers 28 are screwed together and rear caps 26 and rear retainers 30 are friction fit together. A single front lens element 22a is trapped between a front cap 24 and front retainer 28 and first and second rear lens elements 22b,22c are trapped between a rear cap 26 and rear retainer 30.

The front and rear retainers 28,30 each have a set of one or more cam followers 32,34 (also referred to herein as first cam followers 32 and second cam followers 34, respectively). Shapes and relative locations of the cam followers 32,34 are discussed below, in relation to the cam cylinder 48. The cam followers 32,34 can be separate parts, but are preferably molded in features of the retainers 28,30, such as posts or tabs. The cam followers 32,34 each extend away from the remainder of the respective retainer 28,30. Axial slots 37 can be provided in one or both retainers to allow cam follower to protrude through to the respective cam tracks.

Figure 5:
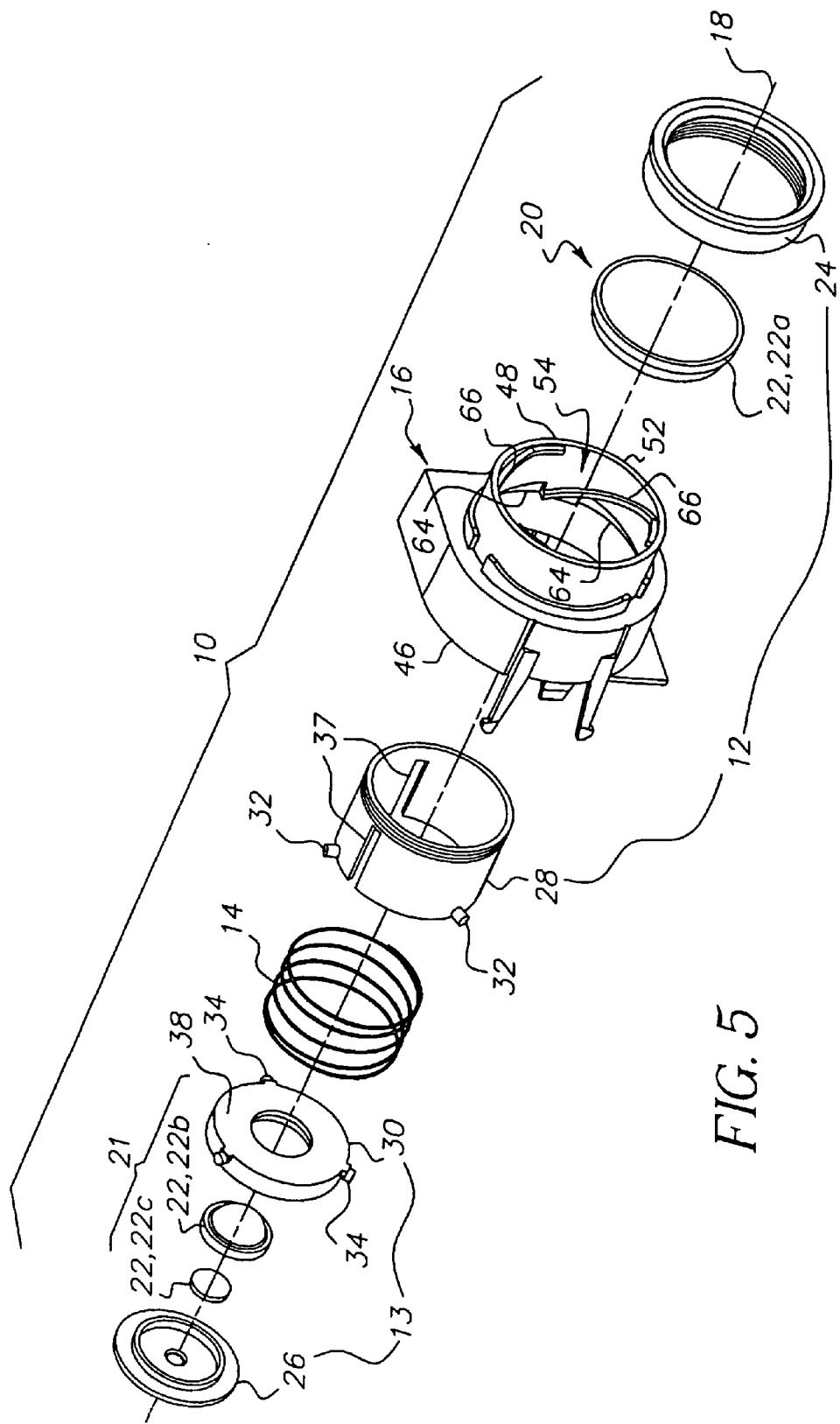
FIG. 5 is an exploded, perspective view of the lens barrel of FIG. 2.
Figure 6:
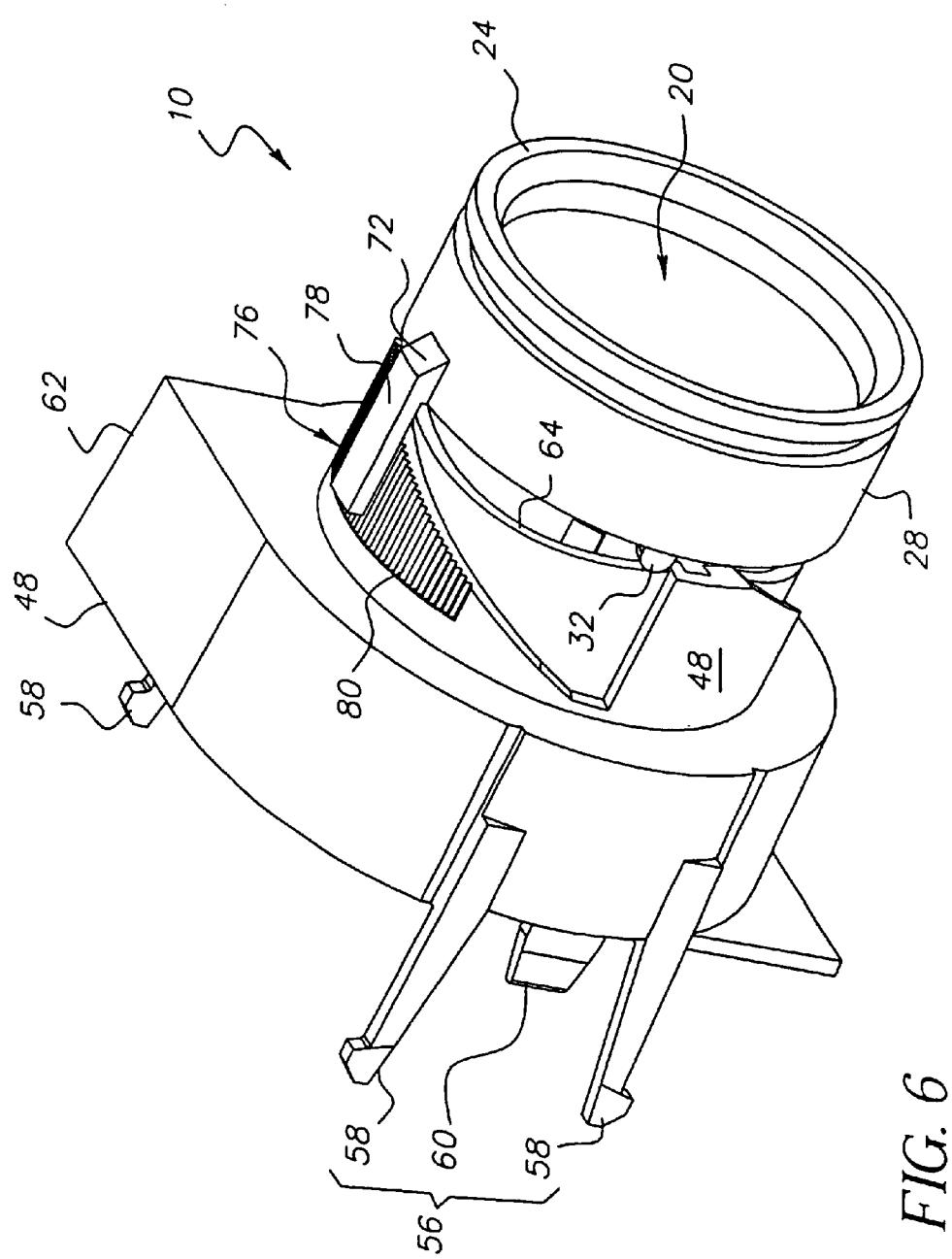
FIG. 6 is a perspective view of another embodiment of the lens barrel.
Figure 7:
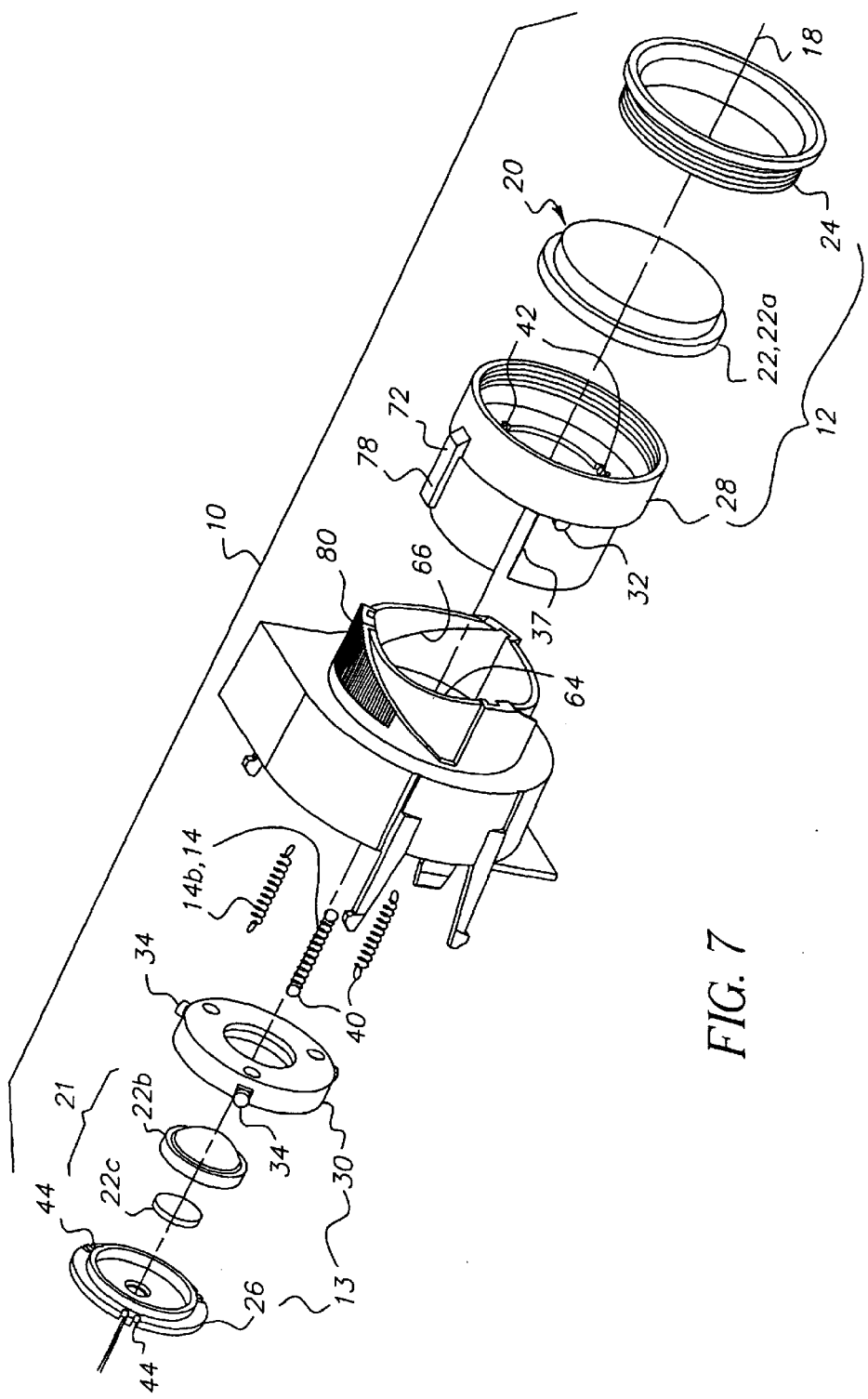
FIG. 7 is an exploded, perspective view of the lens barrel of FIG. 6.

Each lens carrier 12,13 has a seat 36,38 for the biaser 14. The seats 36,38 can be part of the respective retainers 28,30, as shown in FIG. 7. One or both biaser seats 36,38 can also be provided on other components of the lens carriers 12,13, including portions of the lens elements 22 that are outside the light path of the lens barrel 10. This is illustrated in FIG. 5. The biaser 14 is resilient and can consist of one or more springs, with or without an additional supporting structure. The biaser 14 acts as either a tension spring or a compression spring, acting in directions along the optical axis 18. Coil springs are illustrated. Other types of springs, including elastomer elements, can be used in addition or in place of the springs shown.

In the embodiment shown in FIG. 5, the biaser 14 is a single coil spring 14a that is sized to fit within the mount-cam cylinder 16. Opposed ends 40 of the biaser 14 bear on edges of the two retainers 28,30. The inner diameter of the spring 14a is also larger than the diameter of the light path through the lens barrel 10, so that the spring 14a does not interfere with the optical system.

In the embodiment of FIG. 7, the biaser 14 is three small diameter coil springs 14b and the biaser seats 36,38 are each a set of three holdfasts 42,44 that are configured to retain respective ends 40 of the springs 14b.

Figure 3:
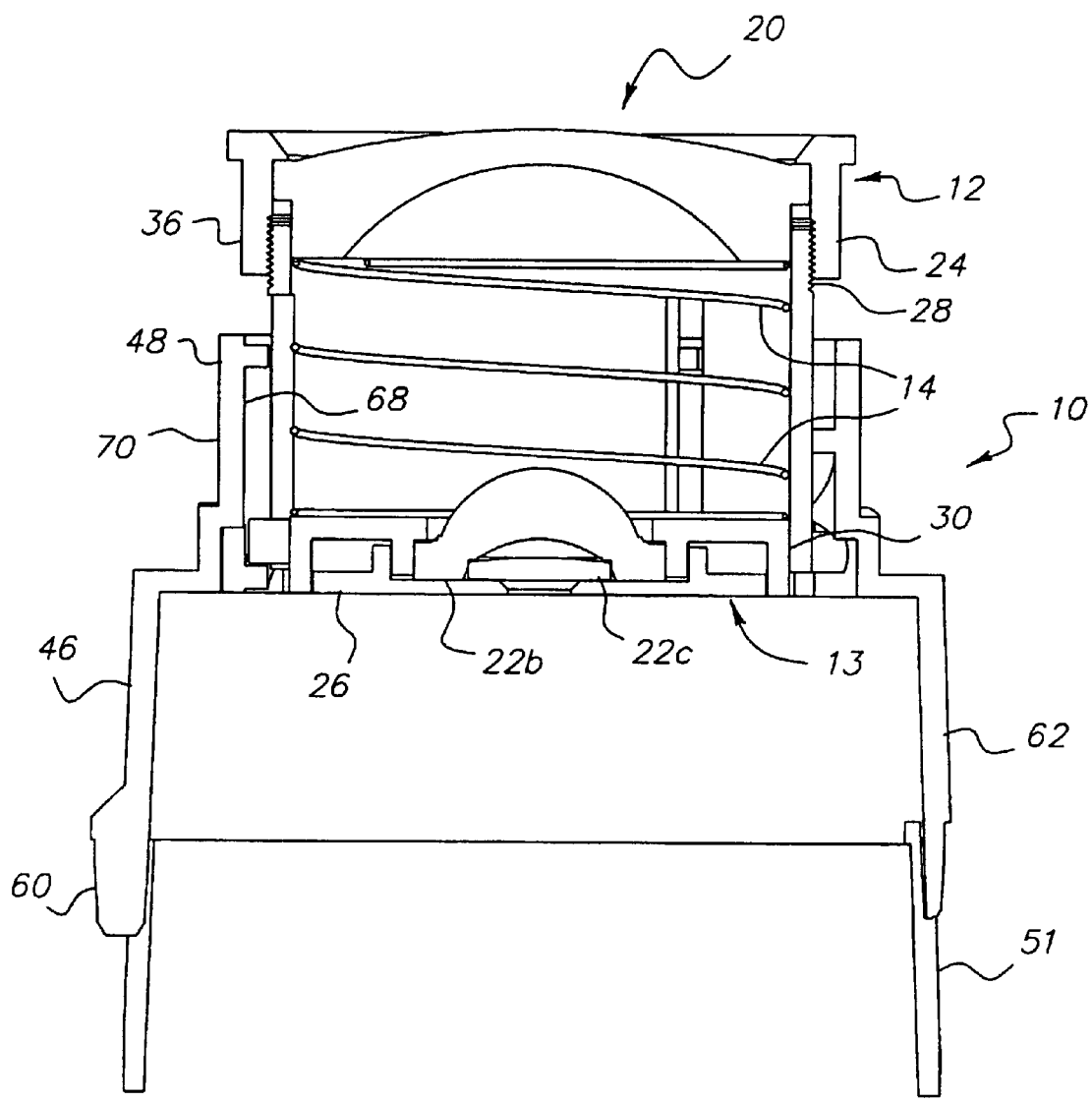
FIG. 3 is a cross-sectional view of the lens barrel of FIG. 2 taken substantially along line 3—3 of FIG. 4.
Figure 4:
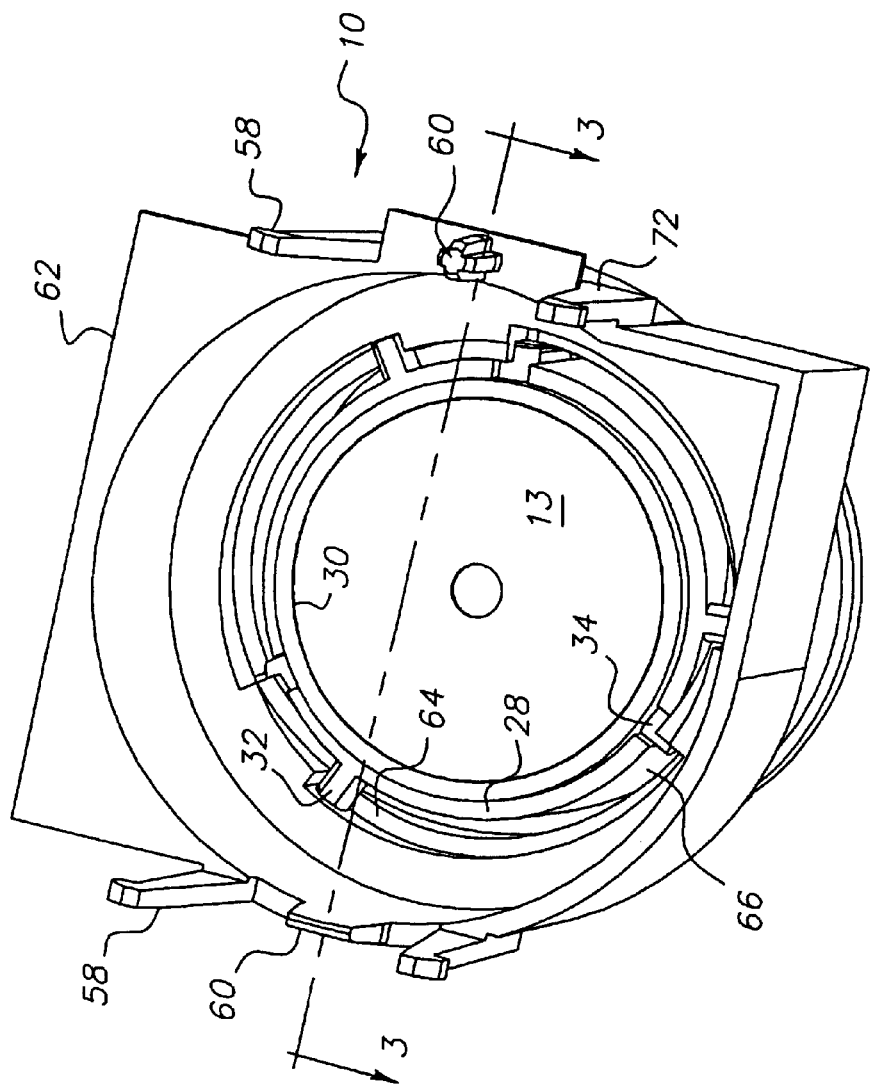
FIG. 4 is a rear view of the lens barrel of FIG. 2.

The mount-cam cylinder 16 includes a mount 46 and a cam cylinder 48. In use, the cam cylinder 48 is immobile relative to the mount 46. The mount 46 is adapted to be joined in immobile relation to a camera body 50 (shown in FIG. 1). In the embodiments illustrated, the lens barrel is attached to an internal frame 51 (shown in FIG. 3), within the camera body 50. The lens barrel 10 can also be attached to the outside of the camera body 50.

The mount-cam cylinder 16 can be a two piece assembly, but assembly is simpler, if the mount-cam cylinder 16 is manufactured as a one-piece plastic casting. The cam cylinder 48 has a tubular wall 52 that surrounds a passage 54. The mount 46 surrounds a continuation of the passage 54. The passage 54 defines and is cocentric with the optical axis 18 of the lens barrel 10. (All terminology used herein that relates to an axis, such as "radial" and "axial", is relative to the optical axis 18. For example, "a radial" direction is in a plane perpendicular to the optical axis 18 and an "axial" direction parallels or coextends with the optical axis 18.)

The mount 46 has an attachment feature 56 that is used to hold the lens barrel 10 in place against the camera body 50. The type and configuration of attachment feature 56 can be any of the many types that have been used in the past, such as: reciprocal screw threads, bayonet mounts, friction fit, adhered or mechanical fastened parts, or the like. In the embodiments illustrated, the mount 46 has two pair of opposed snap hooks 58 and one of two different locating pins 60 positioned between members of each pair of snap hooks 58. The hooks 58 and pins 60 extend outward from a cowl 62 that is shaped so as to overlap part of the camera body 50. The cowl 62 can provide light locking to reduce any risk of flare.

The cam cylinder 48 extends axially outward and forward from the mount 46. The wall 52 of the cam cylinder 48 has a set of one or more first cam tracks 64 and a set of one or more second cam tracks 66. The cam tracks 64,66 and cam followers 32,34 are matched one-to-one. Each cam track 64,66 engages a respective cam follower 32,34. Numbers of cam followers 32,34 and cam tracks 64,66, in each set, can be changed.

The first cam tracks 64 and second cam tracks 66 are spaced apart in an axial direction. The cam tracks 64,66 can be parts of slots in the cam cylinder 48, but are preferably in the form of rails that protrude from the wall 52 of the cam cylinder 48 in a radial direction or axially at an end of the cam cylinder. Cam tracks 64,66 in the form of rails increase the strength of the cam cylinder 48 and assembly of parts during manufacturing can be simpler. In the following discussion and in the drawings all of the cam tracks 64,66 are rails.

The biaser 14 biases the cam followers 32,34 against respective cam tracks 64,66. If the biaser 14 acts as a compression spring, then the lens carriers 12,13 are biased away from each other in axial directions. If the biaser 14 acts as a tension spring, then the lens carriers 12,13 are biased toward each other in axial directions. The cam tracks 64,66 are oriented so as oppose the biasing of the biaser 14. In the embodiment of FIG. 5, second cam tracks 66 are axially forward of first cam tracks 64. In the embodiment of FIG. 7, first cam tracks 64 are axially forward of second cam tracks 66. Cam followers 32,34 are positioned so as to engage the respective cam tracks 64,66. Thus, the biaser 14 biases the cam followers 32,34, in axial directions, toward respective cam tracks 64,66. The two different axial directions are away from each other, if the biaser 14 acts as a compression spring; and toward each other, if the biaser 14 acts as a tension spring.

The wall 52 of the cam cylinder 48 has an inner face 68 adjoining the passage 54 and an outer face 70 opposite the inner face 68. In particular embodiments, one set of cam tracks 64 or 66 extends radially inward from the inner face 68. These cam tracks 64 or 66 are disposed interior to the wall 52 and within the passage 54. A second set of cam tracks 66 or 64 can likewise extend radially inward from the inner face 68. This is the case with the lens barrel 10 of FIG. 5. The second set of cam tracks 66 or 64 can, alternatively, extend outward from the outer face 70 of the wall 52 or form a rim between inner and outer faces 68,70 at the end of the wall 52. The latter is shown in FIG. 7. For convenience in assembly, it is preferred that one of the sets of cam tracks 64 or 66 is located radially inward from the other set. This is the case with the embodiments illustrated.

The lens carriers 12,13 are continuously biased toward respective default positions by the biaser 14. The default position for the lens barrel 10 of FIG. 5 is at a maximum separation of the lens groups 20. With a zoom wide-telephoto lens system, this is the wide angle position. The default position for the lens barrel 10 of FIG. 7 is at a minimum separation of the lens groups 20. With the same wide-telephoto lens system, this is the telephoto position.

The relative positions of the lens carriers 12,13 is changed by moving one of the lens carriers 12 or 13 relative to the mount-cam cylinder 16 and relative to the other lens carrier 13 or 12. When the lens carriers 12,13 are moved, cam tracks 64,66 guide the respective cam followers 32,34 along paths that curve about and extend along the optical axis 18, in a spiral or more complex curve determined by the optical design of the lens system.

One of the two lens carriers 12,13 is connected to a driver 72, which rotates one of the lens carriers 12,13, causing cam followers 32,34 of both carriers 12,13 to move along the respective cam tracks 64,66 to a new combination of locations of the cam followers 32,34 on respective cam tracks 64,66. The driver 72 illustrated in the figures is a lever that is joined to the retainer 28 of the front lens carrier 12. For simplicity, the driver 72 can be molded as a part of the front retainer 28. The driver 72 can be manipulated directly by the user. Alternatively, the lens barrel 10 can be covered by a shroud 73 and the driver 72 can be moved by user manipulation of a slider or other control feature 74 that is engaged or meshed with the driver 72. Other types of user controls can also be used. For example, the driver 72 can be a gear or gear train meshed with teeth formed on the circumference of one of the lens carriers 12,13. The driver 72 can be a motor or can include a motor.

The lens barrel 10 includes a clutch 76 that holds the lens carriers 12,13 in a selected position against the biasing of the biaser 14. The clutch 76 is independent of the biaser 14 so as to avoid a risk of binding during use. The clutch 76 can be limited to one or more predetermined lens carrier positions or can hold the lens carriers 12,13 at any possible position. The latter case is illustrated in the figures. At the end of the driver 72 is a flexible pawl 78 that engages teeth 80 molded into the mount-cam cylinder 16. The pawl 78 is bent outward slightly to release the pawl 78, allowing the user to manipulate the driver 72 and zoom the lens carriers between positions. This clutch 76 can be limited to predetermined positions by provision of teeth 80 at only those positions. For example, the lens barrel 10 can be limited to two positions: full telephoto and full wide angle. The clutch 76 can hold the lens carriers 12,13 at one position, with the other position being a default, or the clutch 76 can hold at both positions.

What is claimed is:

1. A multiple position lens barrel comprising:

a first lens carrier defining an optical axis, said lens carrier having a set of first cam followers;

a second lens carrier aligned with said optical axis, said second lens carrier having a set of second cam followers;

a cam cylinder having a tubular wall surrounding a passage aligned with said optical axis, said cam cylinder having a set of one or more first cam tracks and a set of one or more second cam tracks, said first earn tracks and said second cam tracks being axially spaced apart, each said cam track extending away from said wall in a radial direction, each said cam track extending along and about said optical axis; and a biaser biasing said cam followers toward respective said cam tracks.

2. The lens barrel of claim 1 wherein said biasing of said cam followers is in axial directions.

3. The lens barrel of claim 1 wherein said first cam followers are biased in a first axial direction and said second cam followers are biased in a second axial direction opposite said first axial direction.

4. The lens barrel of claim 1 further comprising a mount immobilely joined to said cam cylinder, said mount having a continuation of said passage, said mount having an attachment feature.

5. The lens barrel of claim 1 wherein said first cam tracks extend radially inward interior to said cylinder.

6. The lens barrel of claim 5 wherein said second cam tracks are disposed radially outward from said first cam tracks.

7. The lens barrel of claim 1 wherein said cam tracks each face axially outward and said biaser biases said lens carriers toward each other.

8. The lens barrel of claim 1 wherein said cam tracks each face axially inward and said biaser biases said lens carriers away from each other.

9. The lens barrel of claim 1 wherein said first cam tracks are axially inward from said second cam tracks.

10. The lens barrel of claim 1 wherein said biaser is a single compression spring disposed between said lens carriers.

11. The lens barrel of claim 1 wherein said biaser has a plurality of spaced apart springs, each said spring having a first end attached to said first lens carrier and a second end attached to said second lens carrier.

12. The lens barrel of claim 1 further comprising a clutch releaseably immobilizing said lens carriers relative to said cam cylinder.

13. The lens barrel of claim 12 wherein said clutch is independent of said biaser.

14. The lens barrel of claim 1 wherein said first cam tracks define a rim between said inner and outer faces.

15. The lens barrel of claim 1 wherein said cam cylinder and said mount are a one-piece plastic casting.

16. A multiple position lens barrel comprising:

a first lens carrier defining an optical axis, said lens carrier having a set of first cam followers;

a second lens carrier aligned with said optical axis, said second lens carrier having a set of second cam followers;

a one-piece mount-cam cylinder including a mount and a cam cylinder, said mount being joinable to a camera body, said cam cylinder having a tubular wall surrounding a passage, said cam cylinder having a set of inner cam tracks extending into said passage from said wall, each said inner cam track guiding a respective said first cam follower on an inner path extending along and about said optical axis interior to said wall, said cam cylinder having a set of outer cam tracks, said outer cam tracks being axially and radially spaced from said inner cam tracks, each said outer cam track guiding a respective said second cam follower on a second path different than said first path; and a biaser biasing said first and second cam followers in opposite axial directions against respective said cam tracks.

17. The lens barrel of claim 16 wherein said second path is exterior to said first path.

18. The lens barrel of claim 16 wherein said outer cam tracks are disposed interior to said wall and said biaser resists movement of said lens carriers toward each other.

19. The lens barrel of claim 16 wherein said cam surfaces each face axially inward and said biaser biases said lens carriers away from each other.

* * * * *

UNITED STATES PATENT AND TRADEMARK OFFICE
CERTIFICATE OF CORRECTION

PATENT NO.   : 6,741,400 B2
DATED        : May 25, 2004
INVENTOR(S)  : Anthony DiRisio It is certified that error appears in the above-identified patent and that said Letters Patent is hereby corrected as shown below:

<u>Column 5,</u>
Line 42, after "first" delete "earn", insert -- cam --

Signed and Sealed this

Fourteenth Day of December, 2004

JON W. DUDAS
*Director of the United States Patent and Trademark Office*